United States Patent
Jevons

(10) Patent No.: US 8,647,070 B2
(45) Date of Patent: Feb. 11, 2014

(54) REINFORCED COMPOSITE AEROFOIL BLADE

(75) Inventor: Matthew P. Jevons, Derby (GB)

(73) Assignee: Rolls-Royce PLC, London (GB)

( * ) Notice: Subject to any disclaimer, the term of this patent is extended or adjusted under 35 U.S.C. 154(b) by 789 days.

(21) Appl. No.: 12/778,642

(22) Filed: May 12, 2010

(65) Prior Publication Data

US 2010/0296942 A1    Nov. 25, 2010

(30) Foreign Application Priority Data

May 21, 2009   (GB) .................................. 0908707.3

(51) Int. Cl.
*F01D 5/14*   (2006.01)
(52) U.S. Cl.
USPC ........................................................ 416/224
(58) Field of Classification Search
USPC ................................... 416/224; 244/198, 124
See application file for complete search history.

(56) References Cited

U.S. PATENT DOCUMENTS

| | | | |
|---|---|---|---|
| 1,545,560 A | * | 7/1925 | Heath ............................ 416/224 |
| 4,621,980 A | * | 11/1986 | Reavely et al. ................ 416/226 |
| 5,269,658 A | * | 12/1993 | Carlson et al. ............ 416/229 R |

FOREIGN PATENT DOCUMENTS

| | | |
|---|---|---|
| FR | 2 683 764 A1 | 5/1993 |
| GB | 1311806 | 3/1973 |
| GB | 1 437 236 | 5/1976 |
| WO | WO 92/02410 | 2/1992 |

OTHER PUBLICATIONS

British Search Report issued on Sep. 17, 2009 in British Patent Application No. GB0908707.3.

* cited by examiner

*Primary Examiner* — Dwayne J White
(74) *Attorney, Agent, or Firm* — Oliff PLC

(57) ABSTRACT

The present invention relates to an aerofoil blade comprising a root, a tip, a leading edge and a trailing edge. At least part of the tip and at least a part of the trailing edge of the blade are reinforced by at least one portion of drapable reinforcing material wrapped around the tip and trailing edge.

17 Claims, 4 Drawing Sheets

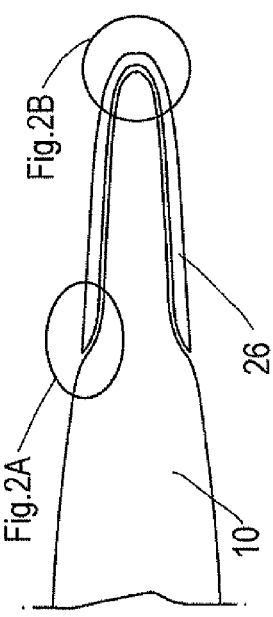
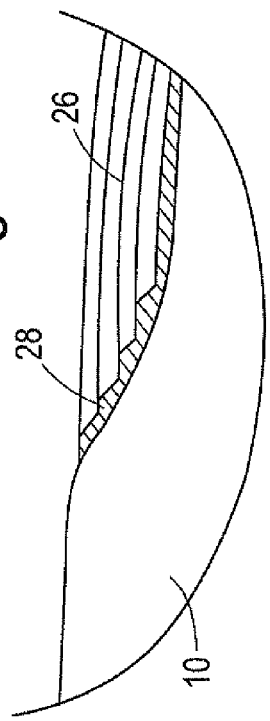
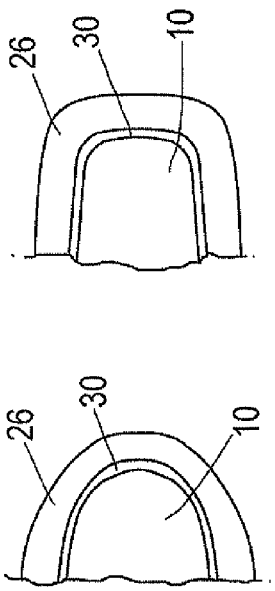
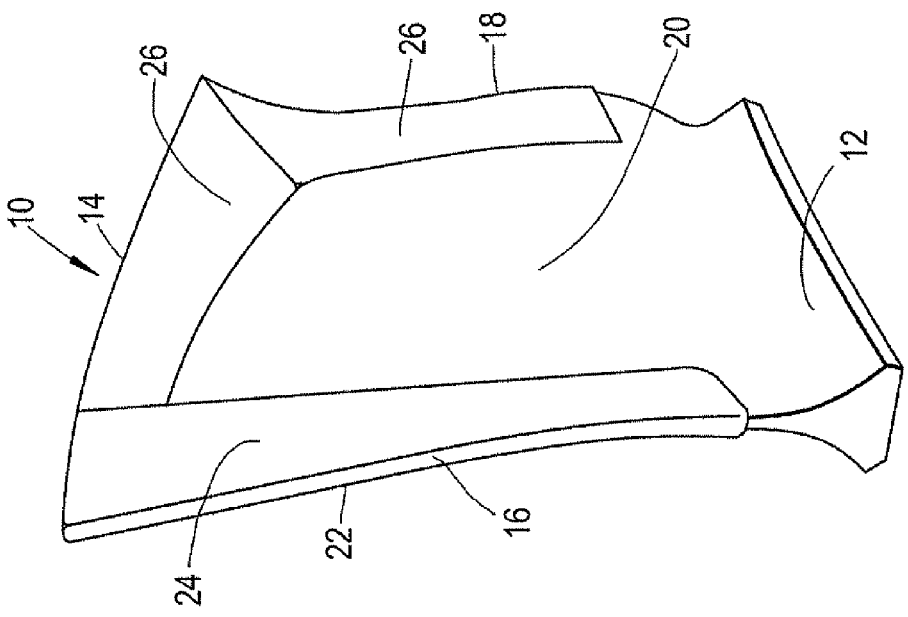

REINFORCED COMPOSITE AEROFOIL BLADE

The present invention relates to the reinforcement of composite aerofoil blades and is concerned particularly with the reinforcement of the tips and trailing edges of such blades.

When a large object, such as a bird, strikes a composite blade of an aircraft, such as a fan blade, there is the potential for a great deal of damage to the blade which could lead to the destruction of the blade and consequential loss of engine performance.

During a so-called bird strike the blade experiences large bending deformations, particularly towards the tip of the blade, which cause large strains to occur in the outer plies of the composite material. In a fibre-reinforced composite fan blade this can lead to failure of the fibres or even detachment of the outer plies as the strain is generally above the failure strain of the composite material itself. Adding metal components can help to deal with the problem of high strains. However, when bonding metal to composite material variability in the strength of the bond can lead to detachment of the metal work from the composite material due to failure of the adhesion layer, or else failure of the composite layer immediately below the metal work.

In addition, bird strike events can establish interlaminar shear and through-thickness direct stresses in the free edges of the blade, especially near the tip and the trailing edge of the blade. These stresses can lead to delamination of the free edges, which delamination can propagate rapidly throughout the blade if nothing is put in place to arrest the progress of the delamination.

The worst region for potential delamination growth is at the tip of the blade towards its trailing edge, where a whiplash effect can be observed during a bird strike. Once delamination begins here, the two-parts of the delaminated area themselves become more prone to whiplash effects and this causes the delamination to worsen.

Through-thickness reinforcements such as pinning, stitching, tufting, braiding or weaving can add more strength to the laminate in its weakest direction. However, the deflections and energies involved in a bird strike are often of such magnitude that these reinforcements are insufficient to prevent the delaminations from being created and may only slow or limit their propagation. Adding through-thickness reinforcement has the added disadvantage that it displaces the reinforcing fibres which run in the plane of the laminate, which in turn has the effect of reducing the in-plane properties of stiffness and strength. This can then compromise other strength requirements such as the requirement to resist the high surface strains experienced during a bird strike.

The present invention is defined in the attached independent claims to which reference should now be made. Further preferred features may be found in the sub-claims appended thereto.

According to the invention there is provided a composite aerofoil blade comprising a root, a tip, a leading edge a trailing edge, a pressure side and a suction side wherein at least part of the tip and at least a part of the trailing edge of the blade are reinforced by at least one portion of drapable reinforcing material wrapped around the tip and trailing edge and over a limited portion of the suction side and the pressure side, wherein at least one portion of drapable reinforcing material comprises a fibre-reinforced wrap.

Preferably the aerofoil is provided with a plurality of portions of drapable reinforcing material.

Preferably the orientation of the fibres in the wrap is arranged so as in use to direct stress waves along the trailing edge, in the event of an object impacting the tip.

The orientation of the fibres of the wrap may be arranged so as to increase the stiffness of the trailing edge.

Preferably the aerofoil blade has separate portions of drapable reinforcing material wrapped at least partly around the tip and trailing edge respectively.

The separate portions of drapable reinforcing material may be arranged to at least partly overlap.

Preferably the reinforcing material wrapped about the tip comprises plies orientated at +45° and −45°.

The reinforcing material wrapped about the trailing edge may comprise plies orientated at an angle between +30° and −30°.

The plies within the reinforcing material wrapped around the trailing edge may be orientated between +15° and −15°. The plies within the reinforcing material wrapped around the trailing edge may predominately be arranged at 0° C.

The invention also includes a method of reinforcing an aerofoil blade having a root, a tip, a leading edge and a trailing edge, the method comprising wrapping a portion of drapable reinforcing material around at least a part of the tip and at least a part of the trailing edge.

The method preferably comprises wrapping a plurality of portions of drapable reinforcing material.

The method may include wrapping a portion of drapable reinforcing material comprising fibre-reinforced wrap.

Preferably the method comprises orientating the wrap so that the fibres in the wrap are able to direct stress waves along the trailing edge in the event of an object impacting the tip in use.

The method may comprise orientating the wrap so that the fibres increase the stiffness of the trailing edge.

In a preferred arrangement the method comprises wrapping separate portions of drapable reinforcing material at least partly around the tip and trailing edge respectively.

The method may comprise arranging the separate portions of drapable reinforcing material to at least partly overlap.

Preferred embodiments of the present invention will now be described by way of example only with reference to the accompanying drawings in which:

FIG. 1 shows a carbon-fibre reinforced composite fan blade in accordance with an embodiment of the present invention;

FIGS. 2, 2a and 2b show in more detail an edge of the composite blade of FIG. 1;

Figure 3:
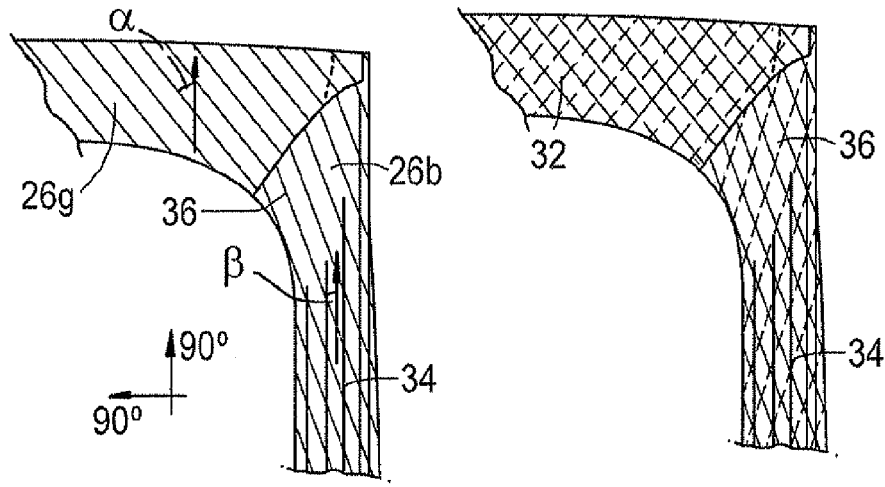
FIG. 3 is a more detailed view of the tip and trailing edge region of the blade of FIGS. 1 and 2.

Embodiments of the present invention illustrate a method of reinforcing the trailing edge and tip of a carbon-fibre-reinforced composite fan blade that results in a blade which is more resistant to bird strike and more tolerant of damage.

The method provides through-thickness reinforcement of the free edges at the tip and the trailing edge that can resist delaminating stresses—i.e. through-thickness shear and tensile stress—by wrapping drapable reinforcing material around the trailing edge and tip respectively. This results in the composite blade retaining its overall shape during a bird strike and also minimises damage due to the dynamic response of the blade. Significantly, this is achieved without compromising the in-plane mechanical properties of the blade itself.

The embodiments described below consider the use of fibre-reinforced plastics as the drapable reinforcing material which can provide the further benefit of tuning the trailing edge against certain damaging natural frequencies, by shifting the damaging frequencies to less damaging ones.

In particular, the embodiment presented below in detail is of a carbon-fibre-reinforced composite fan blade which is reinforced at its trailing edge and at its tip using carbon-fibre-reinforced composite wraps which are co-bonded to the blade. The wraps have continuous folded edges and have different and carefully selected layup configurations at the tip and at the trailing edges.

The embodiment depicted in FIG. 1 is a carbon-fibre-reinforced epoxy composite tip and trailing edge reinforcement, wrapped around the free edges of, and co-bonded to, a carbon-fibre-reinforced composite blade. The wraps are made in two pieces—one for the tip and one for the trailing edge—have different layups and are, in this preferred embodiment, arranged to partially overlap each other. The plies are of unidirectional fibres.

Turning to FIG. 1, this shows a large-diameter carbon-fibre-reinforced composite fan blade 10 comprising a root 12, a tip 14, a leading edge 16 and a trailing edge 18. The blade has a pressure side 20 and a suction side 22. The leading edge is encased in a protective leading edge component 24. The tip 14 is provided with a carbon-fibre-reinforced composite wrap 26 as is the trailing edge, in accordance with an embodiment of the invention.

FIG. 2 shows the wrap 26 formed around a free edge of the composite blade 10. In more detail FIG. 2a shows how the forming process causes the plies at the edge of the wrap to slide past each other which gives a natural tapered transition from the body of the composite blade 10 to the wrap 26. FIG. 2b shows how the wrap 26 and an adhesion layer 30 follow the free edge of the blade. For very thin edges, such as are found at the trailing edge of the blade 10, there is a continuous radius around the edge (see the left hand side of FIG. 2b) and for thicker edges, as can be found at the tip of the blade 10, there is a flat region around the edge (as can be seen from the right hand side of FIG. 2b).

Turning to FIG. 3, this shows in more detail the tip and trailing edge regions. The tip wrap 26a is made up of plies 32 which are oriented at an angle +/− alpha (shaded in the drawing) which in this embodiment comprises +45° and −45°. The orientation of the plies is chosen so that the wrap 26a can withstand the high surface strains to which the tip region is subjected during a bird strike, without failing, whilst still giving good through-thickness reinforcement at the tip free edge. Furthermore the orientation of the plies of +/− 45° helps to provide stiffness, which resists the considerable whiplash effect observed at the trailing edge end of the tip during a bird strike.

The trailing edge wrap 26b is made up of predominantly 0° plies 34 away from the tip of the blade and plies 36 oriented at an angle of +/− beta (shaded in the drawing), which in this embodiment is between +15° and −15°. The angles of the these plies are arranged to protect the 0° plies from handling damage as well as to assist in the propagation of waves along the trailing edge as opposed to remaining perpendicular to it. The +/− beta plies also lend through-thickness stiffness around the trailing free edge. The 0° plies give increased bending stiffness to the trailing edge which in turn increases the natural frequencies in this region, thereby reducing the wave amplitude. This in turn decreases the risk of damage from excessive trailing edge vibrations following a bird strike.

Figure 4:
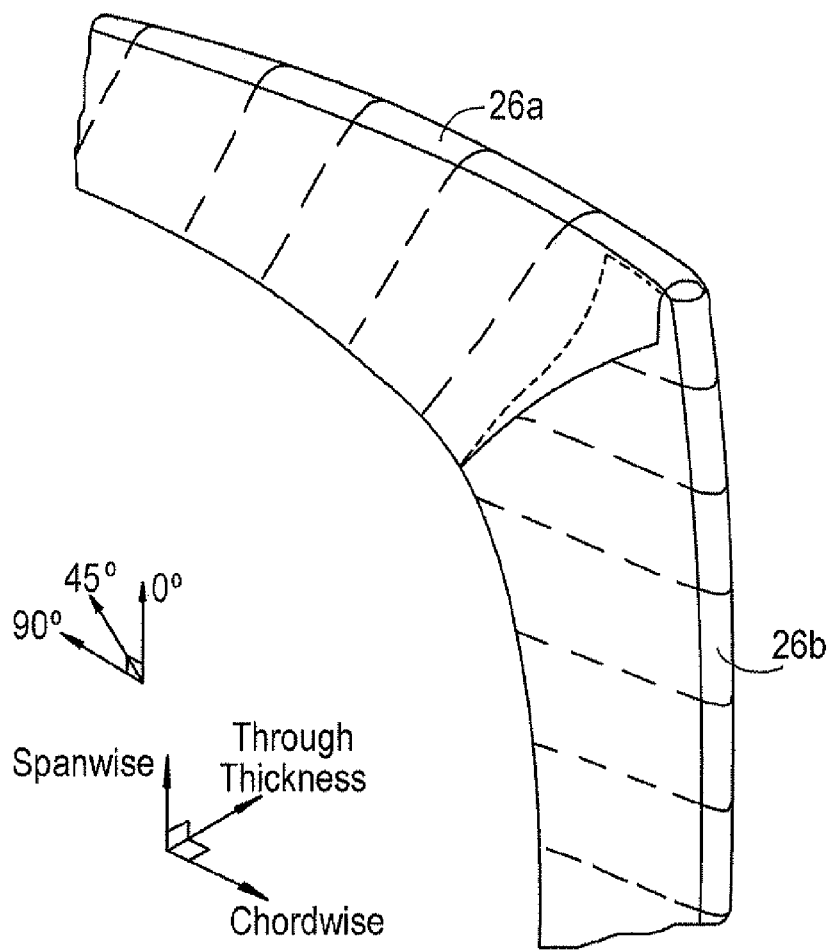
FIG. 4 is a still more detailed view of the tip and trailing edge of the blade of FIGS. 1 to 3.

In this embodiment, the tip and trailing edge wraps are applied separately but arranged to partly overlap. FIG. 4 shows the separate tip 26a and trailing edge 26b wraps, wherein the different layups are chosen so as to optimise their respective functions. Although carbon fibres have been described in this embodiment, choosing fibres of higher stiffness, compared with the bulk of the composite blade, can further increase the surface stiffening effects obtained from the wraps.

The above-described embodiment combines the functionality of tip wraps and trailing edge wraps and particularly seeks to choose specific and separate fibre orientations for the tip and trailing edge in order to perform different tasks.

The fibre orientations are specifically chosen to guide waves of stress propagating during e.g. a bird strike away from the most vulnerable areas such as the trailing edge, and the tip of the trailing edge in particular.

Furthermore, previously considered reinforcement approaches have used high-straining lower modulus fibres simply to sustain the high strains observed during a bird strike. Embodiments of this invention use much stiffer fibres with sufficient strain-to-failure capacity and in wraps which extend along the blade tip and trailing edge to provide a high resistance to through-thickness shear, which can both reduce the tendency of the blade to bend under bird strike and delay or contain any delamination which occurs due to bending.

Figure 5:
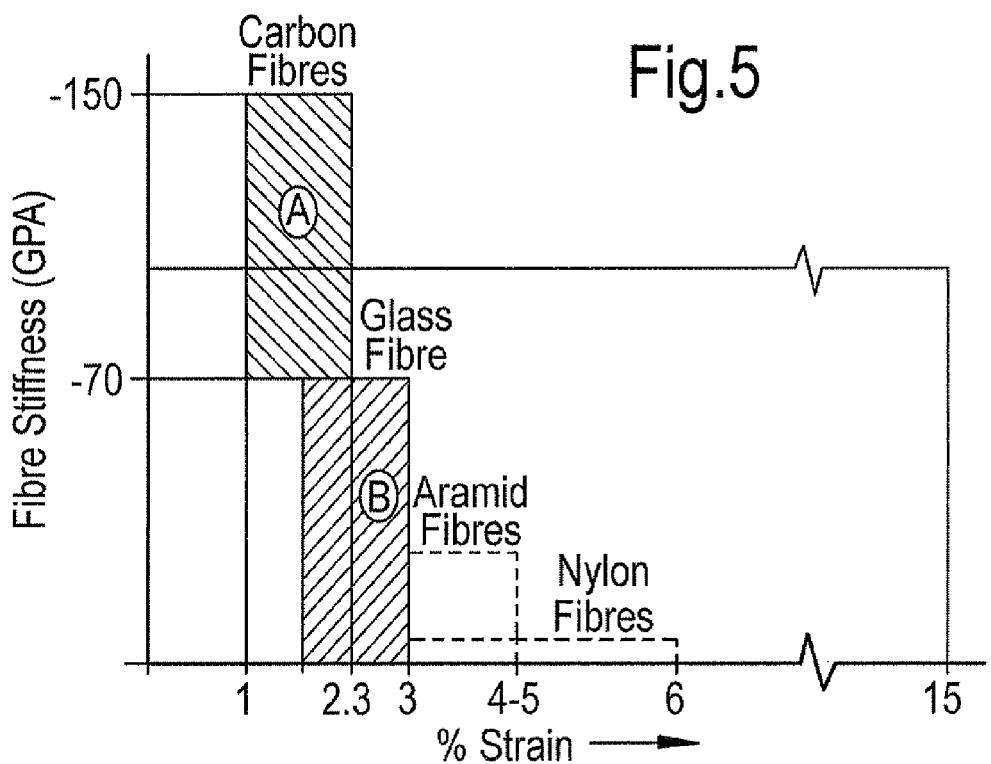
FIG. 5 is a graph showing the relative stiffness of the materials used in reinforcing blades.

FIG. 5 illustrates the characteristics of the fibres used in the embodiments of the present invention (shaded part A).

The wraps can be made from other fibre-reinforced plastics such as glass fibres, aramid fibres, polymeric fibres and natural fibres, and can be combined with other resins such as thermoplastic or phenolic ones. As an alternative to being co-bonded they can be co-cured (i.e. cured as one in the same mould) or secondary bonded (adhered together after initial curing). Co-curing has the benefit of offering the best possible bond surface as the resin flows between the blade and the wrap which effectively become a single component. Whilst this process is complex and expensive it offers the best mechanical properties. With secondary bonding the protective wrap is cured separately and is then bonded to the blade in an extra processing step. This is the least expensive option but also gives the lowest mechanical performance and is most prone to problems with variability and poor quality. The wraps can be preformed using tape-laying or hot forming or even a hand layup technique. They can also be formed directly onto the blade for co-curing or co-bonding. Fibre placement can be used as an alternative to tape laying if finer control of the fibre directions is needed.

Composite plies can be made from woven fabrics instead of unidirectional material. The orientation of the layups can be different from the example given above. In particular, the trailing edge wrap 26b can be made from +/− 30° plies rather than 0°/+15°/−15° layups. It is preferable that the fibres in the reinforcing material pass around the tip or trailing edge from one side of the blade to the other.

Figure 6:
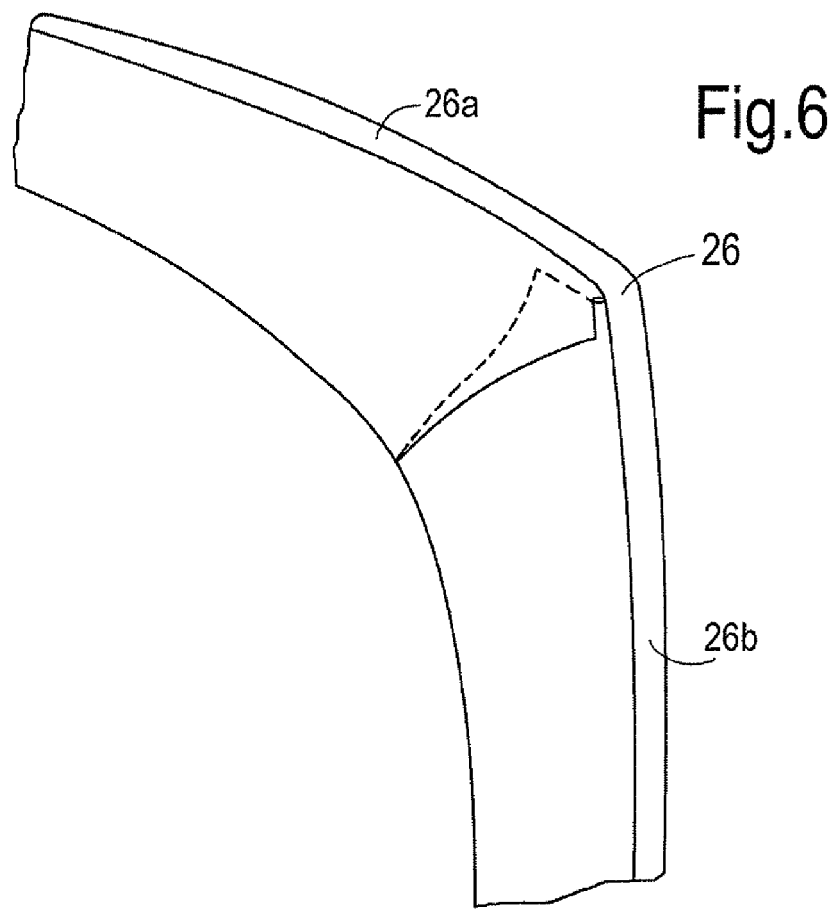
FIG. 6 shows a second embodiment of the present invention.

In this embodiment the tip and trailing edge reinforcements are made of two-parts. However, FIG. 6 shows a second embodiment of the present invention in which tip 26a and trailing edge 26b reinforcing wraps are made of a single wrap in which the plies continue from the trailing edge to the tip, though this allows less flexibility on the choice of layup between the tip and the trailing edge reinforcements.

Figure 7:
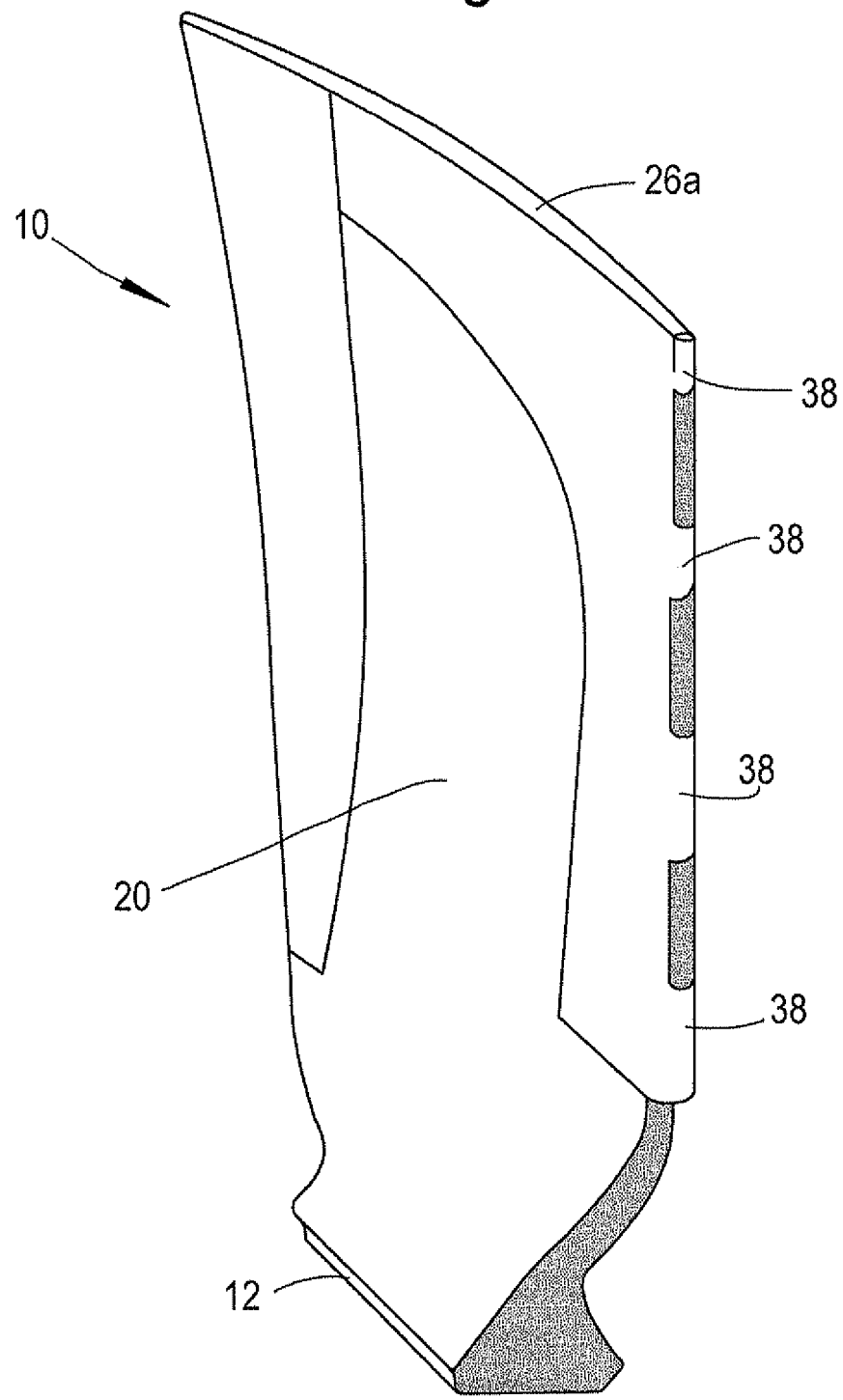
FIG. 7 shows a third embodiment of the present invention.

The wrap need not be continuous along the whole of the edge. A further embodiment is shown in FIG. 7 in which the trailing edge reinforcing wrap is discontinuous. Individual plies 38 are wrapped around the trailing edge only at discreet locations.

The approach taken in the present invention presents a number of advantages.

In particular, the extent of delimination is limited by resisting three dimensional stresses at the free edges and, once a delamination has begun, keeping the two faces thus produced from separating further.

This results in an apparent increase in delamination strength. Stiffness is also increased in bending and direct loading from both careful selection of fibre directions and the added curvature around the free edges (structural stiffening). The overall effect is that the blade retains its aerodynamic shape even after a bird strike which in turn means there is less performance loss in the engine.

Production complexity and also cost is reduced as few steps are required compared with secondary bonding of metal work for example, which requires additional surface treatments. If co-cured the blade and tip and trailing edge protection can be processed in a single step.

In addition, using composite tip and trailing edge protection allows the possibility of further tuning of the bending stiffness of the particular region of the blade. This can be particularly useful at the trailing edge where higher frequency modes can cause the propagation of damage. These can be effectively "tuned out" using specific layups in the trailing edge protection. The wrap around the tip can also be used to apply tip-rubbing protective features without compromising the bulk behaviour of the blade and without adding excessive cost.

Whereas the above-described embodiments have concerned tip and trailing edge reinforcement wraps for a fan blade, the skilled person will readily appreciate that such reinforcement is possible in the tips and trailing edges of other kinds of aerofoils, without departing from the scope of the invention.

For the avoidance of doubt, where a range of values is given in the specification and claims between two values defining the bounds of the range, the range includes the bounding values.

The direction of the lay up of the plies in the defined in relation to the trailing edge i.e. a 0° ply runs in the direction of the trailing edge.

The invention claimed is:

1. A composite aerofoil blade comprising a root, a tip, a leading edge a trailing edge, a pressure side and a suction side wherein at least part of the tip and at least a part of the trailing edge of the blade are reinforced by at least one portion of drapable reinforcing material wrapped around the tip and trailing edge and over a limited portion of the suction side and the pressure side, wherein at least one portion of drapable reinforcing material wrapped around the trailing edge comprises a fiber-reinforced wrap with plies orientated between +15° and −15°.

2. A composite aerofoil blade comprising a root, a tip, a leading edge a trailing edge, a pressure side and a suction side wherein at least part of the tip and at least a part of the trailing edge of the blade are reinforced by at least one portion of drapable reinforcing material wrapped around the tip and trailing edge and over a limited portion of the suction side and the pressure side, wherein at least one portion of drapable reinforcing material comprises a fiber-reinforced wrap.

3. An aerofoil blade according to claim 2 comprising a plurality of portions of drapable reinforcing material.

4. An aerofoil blade according to claim 2, wherein the orientation of the fibers in the wrap is arranged so as in use to direct stress waves along the trailing edge in the event of an object impacting the tip.

5. An aerofoil blade according to claim 2, wherein the orientation of the fibers in the wrap is arranged so as to increase the stiffness of the trailing edge.

6. An aerofoil blade according to claim 2, wherein separate portions of drapable reinforcing material are wrapped at least partly around the tip and trailing edge respectively.

7. An aerofoil blade according to claim 6, wherein the separate portions of drapable reinforcing material are arranged to at least partly overlap.

8. An aerofoil blade according to claim 6, wherein the reinforcing material wrapped about the tip comprises plies orientated at +45° and −45°.

9. An aerofoil blade according to any of claim 6, wherein the reinforcing material wrapped about the trailing edge comprises plies orientated at an angle between +30° and −30°.

10. An aerofoil blade according to claim 9, wherein the plies within the reinforcing material wrapped around the trailing edge are orientated between +15° and −15°.

11. An aerofoil blade according to claim 10, wherein plies within the reinforcing material wrapped around the trailing edge and predominantly 0°.

12. A method of reinforcing a composite aerofoil blade having a root, a tip, a leading edge and a trailing edge, a pressure side and a suction side, the method wherein it comprises wrapping a portion of drapable reinforcing material around at least a part of the tip and at least a part of the trailing edge and over a limited portion of the suction side and the pressure side, wherein at least one portion of drapable reinforcing material comprises a fiber-reinforced wrap.

13. A method according to claim 12, comprising wrapping separate portions of drapable reinforcing material at least partly around the tip and trailing edge respectively.

14. A method according to claim 13, wherein the reinforcing material wrapped about the trailing edge comprises plies orientated at an angle between +30° and −30°.

15. A method according to claim 14, wherein plies within the reinforcing material wrapped around the trailing edge and predominantly 0°.

16. An aero engine comprising an aerofoil blade according to claim 1.

17. An aero engine comprising an aerofoil blade according to claim 2.

* * * * *